United States Patent
Duan et al.

(10) Patent No.: US 11,205,930 B2
(45) Date of Patent: Dec. 21, 2021

(54) AXIAL FLUX MOTOR ASSEMBLIES WITH VARIABLE THICKNESS ROTORS AND ROTORS HAVING INTERIORLY DISPOSED MAGNETS

(71) Applicant: GM GLOBAL TECHNOLOGY OPERATIONS LLC, Detroit, MI (US)

(72) Inventors: Chengwu Duan, Shanghai (CN); Jian Yao, Shanghai (CN); Yusheng Zou, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 16/785,121

(22) Filed: Feb. 7, 2020

(65) Prior Publication Data

US 2021/0152041 A1    May 20, 2021

(30) Foreign Application Priority Data

Nov. 19, 2019   (CN) .......................... 201911135184.1

(51) Int. Cl.
*H02K 1/27* (2006.01)
(52) U.S. Cl.
CPC .................................. *H02K 1/2753* (2013.01)
(58) Field of Classification Search
CPC ...... H02K 1/2753; H02K 15/03; H02K 21/24; H02K 1/2793; Y02E 10/72
See application file for complete search history.

(56) References Cited

U.S. PATENT DOCUMENTS

| | | | |
|---|---|---|---|
| 2005/0127769 A1* | 6/2005 | Minagawa | H02K 21/24 310/156.32 |
| 2020/0106351 A1* | 4/2020 | Sozer | H01F 1/057 |

OTHER PUBLICATIONS

Yao, Jian et al., U.S. Appl. No. 16/426,797, filed May 30, 2019 entitled, "Centrifugal Fluid-Cooled Axial Flux Motor," 32 pages.
Yao, Jian et al., U.S. Appl. No. 16/426,807, filed May 30, 2019 entitled, "Axial Flux Motor Having an Insulated Rotor," 27 pages.

* cited by examiner

*Primary Examiner* — Thomas Truong
(74) *Attorney, Agent, or Firm* — Harness, Dickey & Pierce, LLC

(57) ABSTRACT

The present disclosure relates generally to rotors for electric motor assemblies and methods of making the same, and more specifically, to variable thickness rotors for axial flux motors. More specifically, annular-shaped rotors having interiorly disposed magnets for axial flux motors are provided in certain aspects. The variable thickness rotors may each include an annular-shaped body having a first thickness at a first radial position and a second thickness at a second radial position. The first radial position may be spaced apart from the second radial position. The first thickness may be greater than or equal to about 200% of the second thickness.

19 Claims, 2 Drawing Sheets

AXIAL FLUX MOTOR ASSEMBLIES WITH VARIABLE THICKNESS ROTORS AND ROTORS HAVING INTERIORLY DISPOSED MAGNETS

CROSS-REFERENCE TO RELATED APPLICATIONS

This application claims the benefit and priority of Chinese Patent Application No. 201911135184.1 filed Nov. 19, 2019. The entire disclosure of the above application is incorporated herein by reference.

INTRODUCTION

This section provides background information related to the present disclosure which is not necessarily prior art.

The present disclosure relates generally to rotors for electric motor assemblies and methods of making the same, and more specifically, to variable thickness rotors for axial flux motors and annular-shaped rotors having interiorly disposed magnets also for axial flux motors.

Electric vehicles, including hybrid vehicles, employ electric motors, such as induction motors and permanent magnet motors, to propel the vehicle, as well as to capture braking energy when acting as an electric generator. The electric motor, for example axial flux motors, generally include a rotary component, such as a rotor, that transmits torque through a gear set to the drive wheels of the vehicle, and a stationary component, such as a stator, that contains conductors in the form of wire windings. The rotor rotates relative to the fixed stator and commonly includes a disk having an interior surface that faces the stator whereon a plurality of permanent magnets are disposed. The rotor, including the permanent magnets, is separated from the stator by a predetermined air gap. Attractive forces between the rotor and the stator may make it difficult to maintain a uniform air gap, for example there may be bending deformation of the rotor if the strength of the rotor is not sufficient. Further, axial flux motors having surface mounted magnets may be unable to generate reluctance torque, for example because the reluctances, for example magnetic reluctances, may be the same for both the d-axis (e.g., direct axis) and the q-axis (e.g., quadrature axis). Accordingly, it would be desirable to develop materials and processes that assist in the maintenance of a uniform air gap and permit the generation of reluctance torque.

SUMMARY

This section provides a general summary of the disclosure, and is not a comprehensive disclosure of its full scope or all of its features.

In various aspects, the present disclosure provides a rotor for an electric motor. The rotor includes an annular-shaped rotor body having a first thickness at a first radial position. The rotor has a second thickness at a second radial position. The first radial position is spaced apart from the second radial position. The first thickness may be greater than or equal to about 200% of the second thickness. The rotor further includes a plurality of permanent magnets that define a plurality of magnetic poles.

In one aspect, the annular-shaped rotor body defines a centrally disposed aperture adjacent to the first radial position. The second radial position may correspond to a periphery of the annular-shaped rotor body.

In one aspect, the annular-shaped rotor body may include a soft magnetic composite powder.

In one aspect, the annular-shaped rotor body may further define a plurality of cavities.

In one aspect, a plurality of permanent magnets may be disposed in one or more of the plurality of cavities.

In one aspect, the annular-shaped rotor body may include a metallic strip that is coiled to form an annular shape. A first end of the metallic strip may have a first strip thickness. A second end of the metallic strip may have a second strip thickness. The first strip thickness may be substantially equal to the first thickness. The second strip thickness may be substantially equal to the second thickness.

In one aspect, the metallic strip may include a laminated silicon steel strip.

In one aspect, the metallic strip may be coated on one or more surfaces with a non-electrically conductive material coating.

In one aspect, a plurality of apertures may be stamped into the metallic strip. The apertures may be configured to form a plurality of interior cavities when the metallic strip is coiled to form the annular shape.

In one aspect, a plurality of permanent magnets may be disposed in one or more of the plurality of interior cavities.

In one aspect, the annular-shaped rotor body further defines a first axial surface. A plurality of permanent magnets may be disposed on the first axial surface in a predetermined arrangement.

In various other aspects, the present disclosure provide an axial flux motor. The axial flux motor may include a first annular-shaped rotor defining a first major surface, a second annular-shaped rotor defining a second major surface, a stator disposed between the first and second annular-shaped rotors, and a shaft defining a rotational axis. The second major surface of the second rotor is parallel with the first major surface of the first rotor. Each rotor includes an annular-shaped rotor body including a centrally disposed aperture; a periphery; a first thickness at a first radial position adjacent to the centrally disposed aperture; a second thickness at a second radial position corresponding to the periphery; and a plurality of permanent magnets so as to define a plurality of magnetic poles. The first thickness may be greater than or equal to about 200% of the second thickness. A first gap may exist between the stator and the first annular-shaped rotor. A second gap may exist between the stator and the second annular-shaped rotor. The shaft may be fixedly coupled to the first and second annular-shaped rotors and passes through each centrally disposed aperture of the first and second annular-shaped rotors and is fixedly attached thereto. The shaft traverses the stator, such that the shaft and the first and second rotors rotate together and the stator remains stationary with respect to the rotation of the shaft.

In one aspect, each of the annular-shaped rotor bodies may include a soft magnetic composite powder. A mold-and-press process may be used to form the rotor body, where a mold defines the centrally disposed aperture and the perimeter of the annular-shaped rotor.

In one aspect, the annular-shaped rotor body includes a plurality of cavities and a plurality of permanent magnets may be disposed in one or more of the plurality of cavities.

In one aspect, each of the annular-shaped rotors may include a metallic strip that is coiled to form the annular-shaped rotor body. A first end of the metallic strip may have a first strip thickness. A second end of the metallic strip may have a second strip thickness. The first strip thickness may be substantially equal to the first thickness. The second strip thickness may be substantially equal to the second thickness.

In one aspect, a plurality of apertures may be stamped into the metallic strip. The apertures may be configured to form a plurality of interior cavities when the metallic strip is coiled to form the annular shape. A plurality of permanent magnets may be disposed in one or more of the plurality of interior cavities.

In one aspect, the metallic strip may include a silicon steel strip. The silicon steel strip may be coated on one or more surfaces with a non-electrically conductive material coating.

In one aspect, a plurality of permanent magnets may be disposed on a first axial surface in a predetermined arrangement.

In various other aspects, the present disclosure provides a rotor for an axial flux electric motor. The rotor includes an annular-shaped rotor body. The annular-shaped rotor body includes a metallic strip that defines a first end and a second end. The metallic strip may further include a plurality of apertures. The first end of the metallic strip may have a first thickness. The second end of the metallic strip may have a second thickness. The metallic strip may be coiled to form the annular-shaped rotor body. The first thickness may be greater than or equal to about 200% of the second thickness. A plurality of permanent magnets may be disposed in the plurality of apertures.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
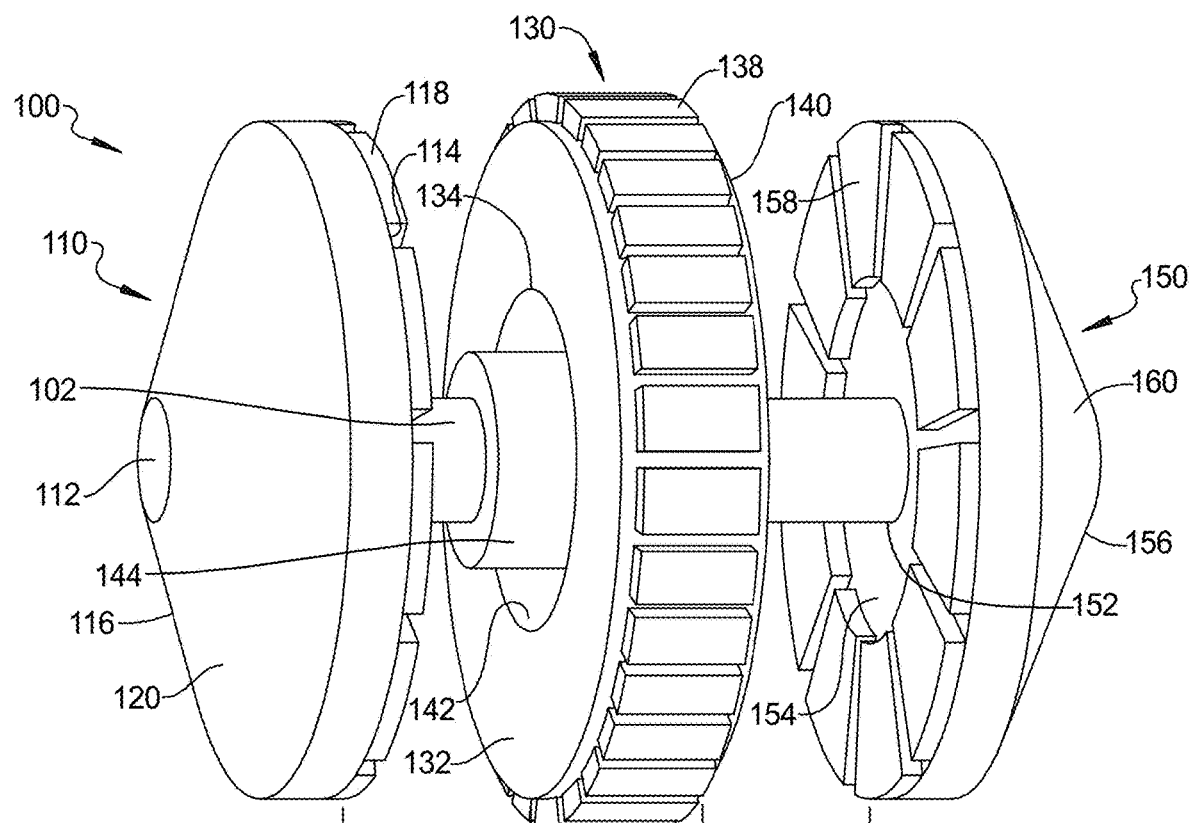
FIG. 1 is a perspective view of an example axial flux motor assembly in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers, and/or sections, these steps, elements, components, regions, layers, and/or sections should not be limited by these terms, unless otherwise indicated. These terms may be only used to distinguish one step, element, component, region, layer, or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rotors for electric motor assemblies and methods of making the same, and more specifically, to variable thickness rotors for axial flux motors and annular-shaped rotors having interiorly disposed magnets, also for axial flux motors. In various instances, such electric motors may be used in, for example, electrical or hybrid automotive or other vehicles. However, the described electric motor and methods may also be used in a variety of other applications, such as boats, motorbikes, and wind turbines, by way of non-limiting example.

FIG. 1 is a schematic illustration of an exemplary electric motor assembly 100, such electric motor assemblies are commonly referred to as pancake motors. The electric motor assembly 100 may be an axial flux motor including first and second rotors 110, 150 and a stator 130 disposed therebetween. The first and second rotors 110, 150 each include a plurality of permanent magnets so as to define a plurality of magnetic poles. The first and second rotors 110, 150 are fixedly coupled to a shaft 102 such that the shaft 102 and the rotors 110, 150 rotate together. The shaft 102 may traverse the stator 130. For example, the shaft 102 may travel through an aperture 134 formed in the stator 130. A bearing 144 disposed within or near the aperture 134 may couple the stator 130 and the shaft 102. The bearing 144 may be configured to rotate with the shaft 102 and the rotors 110, 150 while the stator 130 remains stationary. Axial gaps 170, 180, for example air gaps, exist along a length of the shaft 102 between the stator 130 and each of the first and second rotors 110, 150. For example, a first axial gap 170 may exist between the first rotor 110 and the stator 130, and a second axial gap 180 may exist between the second rotor 150 and the stator 130. The axial gaps 170, 180 may be greater than about 0.5 mm to less than about 2 mm, and in certain aspects, greater than about 1 mm to less than about 3 mm.

Though an electric motor assembly 100 having two rotors 110, 150 and a single stator 130 is illustrated, the skilled artisan will appreciate that in various instances other electric motor assemblies may include more or fewer rotors and/or stators and that the description herein also applies to these other embodiments. Further, though not currently shown, the skilled artisan will appreciate that in various aspects, electric motor assemblies may further include a housing, and the rotors, stators, and shaft may be disposed within the housing. The housing may, in certain aspects, be fixed to a vehicle frame and the shaft may be coupled to a gearbox, for example a reduction gearbox, within the vehicle.

In various aspects, the first rotor 110 has a general annular or disk shape with a centrally disposed rotor center or aperture 112, for example a central perforation. The rotor center 112 may be configured to receive the shaft 102 and, in certain aspects, to be fixedly coupled to the shaft 102, for example using one or more of splines, dowel pins, and bolts. In certain aspects, the shaft 102 may travel through the first rotor 110. In various aspects, as detailed below, the first rotor 110 may be formed from a soft magnetic composite (SMC) material or a laminated metallic strip. In each instance, the first rotor 110 may have a variable thickness. For example, as illustrated, the first rotor 110 may have a first thickness at or near the rotor center 112 (e.g., first radial position) that is greater than a second thickness at or near the radial perimeter of the first rotor 110 (e.g., second radial position). A variable slope connects the first and second thicknesses so as to define an annular-shaped rotor body 120. In certain aspects, the connecting slope may be substantially straight. In other aspects, the connecting slop may be concaved.

In certain aspects, the first thickness of the first rotor 110 at the first radial position may be about 200%, and in certain aspects, about 300%, larger than the second thickness of the first rotor 110 at the second radial position. For example, the first thickness of the first rotor 110 may be greater than or equal to about 10 mm to less than or equal to about 100 mm, and in certain aspects, greater than or equal to about 20 mm to less than or equal to about 50 mm. The second thickness of the first rotor 110 may be greater than or equal to about 5 mm to less than or equal to about 50 mm, and in certain aspects, greater than or equal to about 10 mm to less than or equal to about 30 mm. In this fashion, a centrally disposed or interior portion of the first rotor 110 has a thickness that is greater than a peripheral or exterior portion of the first rotor 110. The variable slope defined by the centrally disposed and peripheral portions of the rotor increases the bending strength of the first rotor 110, for example by at least 200% compared to conventional rotors, so as to reduce bending deformation and improve maintenance of the air gap.

The first rotor 110 has a first or interior radial surface 114 opposing second or exterior radial surface 116. The first radial surface 114 of the first rotor 110 faces the stator 130. In various aspects, the first radial surface 114 may be substantially planar, while the second radial surface 116 may have a tapered or conical shape that defines the various radial thickness of the first rotor 110. The first rotor 110 includes a first plurality of permanent magnets 118. In certain aspects, as illustrated in FIG. 1, the first plurality of permanent magnets 118 may be disposed on the first axial surface 114 of the first rotor 110, which faces the stator 130. For example, the magnets 118 may be spaced apart from each other so as to define a first predetermined arrangement on the first axial surface 114 of the first rotor 110 so as to generate several pole pairs. In various other aspects, as discussed in the context of FIGS. 3A and 3B below, magnets may be disposed within recesses or cavities defined within the first rotor. In each instance, the magnets 118 may be attached to the first rotor 110 using adhesives and mechanical fasteners as known in the art. For example, mechanical fasteners, such as metallic pins and bolts, may be inserted into the magnets 118 and the first rotor 110. Such mechanical fasteners may in certain aspects increase the strength and bending stiffness or resistance of the first rotor 110.

With renewed reference to FIG. 1, the stator 130 includes a stator body 132, for example, having an annular or disk shape with a centrally disposed stator center or aperture 134. The stator center 134 may be configured to receive the shaft 102 and, in certain aspects, to be fixedly coupled to the shaft 102, for example using one or more bearings 144 or snap rings (not shown) as known in the art. In certain aspects, as illustrated, the shaft 102 may travel through the stator 130. The stator 130 includes a plurality of electrically conductive windings 138, for example bar windings. The windings 138 may be configured to interact with the magnetic fields of the pluralities of permanent magnets 118, 158 of the first and second rotors 110, 150, respectively. For example, different regions of the stator 130 may be selectively energized to impart a rotational force on the rotors 110, 150 so as to cause the rotors 110, 150 and the shaft 102 to rotate.

Though not illustrated, other winding configurations and technologies as understood in the art are also contemplated. For example, in certain aspects, the stator body 132 may have a plurality of slots (not shown) and the windings 138, for example bar windings, as illustrated, may extend over or bridge the slots. In other variations, the slots may be configured to receive wire windings that may be wound in and through the slots. The slots may extend through the width of the stator body 132 so as to define a plurality of channels. The channels or slots may extend from a first or exterior surface 140 of the stator body 132 to a second or interior surface 142 of the stator body 132. The second surface 142 of the stator may define the stator center 134. Though not illustrated, in certain aspects, the winding 138 may be placed in the channel or slots so as to travel longitudinally, or in certain aspects axially, between the first and second surfaces 140, 142 of the stator body 132. A plurality of end turns may be formed as the winding 138 exits one slot and enters another. In certain aspects, the stator body 132 may comprise one or more ferromagnetic materials, such as iron, laminated steel, or a soft magnetic composite. The windings 138 may be copper magnet wiring, or any other conductive wires that may be configured to generate a magnetic field as appreciated by one of skill in the art.

In various aspects, the second rotor 150 may be a substantial mirror image of the first rotor 110. For example, the second rotor 150 may also have, for example, a general annular or disk shape with a centrally disposed rotor center or aperture 152, for example a central perforation. The rotor center 152 may be configured to receive the shaft 102 and, in certain aspects, to be fixedly coupled to the shaft 102, for example using one or more of splines, dowel pins, and bolts. In certain aspects, the shaft 102 may travel through the second rotor 150. In various aspects, as detailed below, the second rotor 150 may be formed from a soft magnetic composite (SMC) material or a laminated metallic strip. In each instance, the second rotor 150 may also have a variable thickness. For example, like the first rotor 110, the second rotor 150 may have a first thickness at or near the rotor center 152 (e.g., first radial position) that is greater than a second thickness at or near the radial perimeter of the second rotor 150 (e.g., second radial position). A variable slope connects the first and second thicknesses so as to define a rotor body 160. In certain aspects, the connecting slope may be substantially straight. In other aspects, the connecting slop may be concaved.

The first and second thicknesses of the second rotor 150 may be the same or different from the first and second thicknesses of the first rotor 110. For example, in certain aspects, the first thickness of the second rotor 150 at the first radial position may be greater than or equal to about 200%, and in certain aspects, greater than or equal to about 300%, larger than the second thickness of the second rotor 150 at the second radial position. For example, the first thickness of the second rotor 150 may be greater than or equal to about 10 mm to less than or equal to about 100 mm, and in certain aspects, greater than or equal to about 20 mm to less than or equal to about 50 mm. The second thickness of the second rotor 150 may be greater than or equal to about 5 mm to less than or equal to about 50 mm, and in certain aspects, greater than or equal to about 10 mm to less than or equal to about 30 mm. In this fashion, a centrally disposed or interior portion of the second rotor 150 has a thickness that is greater than a peripheral or exterior portion of the second rotor 150. The variable slope defined by the centrally disposed and peripheral portions of the rotor increases the bending strength of the second rotor 150, for example by at least 200% compared to conventional rotors, so as to reduce bending deformation and improve maintenance of the air gap.

Like the first rotor 110, the second rotor 150 may have a first or interior radial surface 154 that opposes a second or exterior radial surface 156. The first radial surface 154 of the second rotor 150 faces the stator 130. In various aspects, the first radial surface 154 may be substantially planar, while the second radial surface 156 may have a tapered or conical shape that defines the various radial thickness of the second rotor 150. The second rotor 150 includes a second plurality of permanent magnets 158. In certain aspects, as illustrated in FIG. 1, the second plurality of permanent magnets 158 may be disposed on the first axial surface 154 of the second rotor 150, which faces the stator 130. For example, the magnets 158 may be spaced apart from each other so as to define a second predetermined arrangement on the first axial surface 154 of the second rotor 150 so as to generate several pole pairs. The second predetermined arrangement may be the same or different from the first predetermined arrangement. In various other aspects, as discussed in the context of FIGS. 3A and 3B below, magnets may be disposed within recesses or cavities defined within the second rotor. In each instance, like the first plurality of magnets 118, the second plurality 158 may be attached to the first axial surface 154 of the second rotor 150 using adhesives and mechanical fasteners as known in the art.

In various aspects, the present disclosure provides methods of forming variable thickness rotors, such as the first and second rotors 110, 150 illustrated in FIG. 1. As noted above, in certain aspects, variable thickness rotors may comprise one or more powder metal magnetic materials, for example a non-conductive, soft magnetic composite ("SMC") material, for example a soft magnetic material powder. Soft magnetic composite materials comprise a soft magnetic material, for example ferromagnetic material comprising iron powder particles, that may in certain aspects be covered or coated with an electrically insulating layer. Other example soft magnetic materials include iron alloys comprising silicon, nickel, and/or phosphorus, by way of example. Still other examples include rare earth metal compounds, such as those comprising samarium (Sm), neodymium (Nd), like samarium cobalt (SmCo 1:5), samarium cobalt (SmCo 2:17), neodymium iron boron (NdFeB). Further examples of suitable magnetic particles include aluminum nickel cobalt (AlNiCo) alloys. The electrically insulating layer that covers or coats the soft magnetic material may comprise a non-magnetic material, such as a siloxane-based material, like a silicone varnish, or a metal-organic or inorganic insulating material, for example a silicate layer, an oxide layer, a phosphate layer, and equivalents and combinations thereof. In this manner, soft magnetic material particles may be insulated from each other. Such soft magnetic composite materials may be readily formed into a variety of different and complex shapes.

When the variable thickness rotors comprise the one or more powder metal magnetic materials, variable thickness rotors, such as the first and second rotors 110, 150 illustrated in FIG. 1, may be formed using, for example, a mold-and-press process. Such a process may include placing a precursor powder comprising the soft magnetic composite material in a pre-defined mold and adding varying amounts of pressure and, in certain instances, heat to solidify the precursor powder. The outline of the mold defines the variable thickness of the rotor. The skilled artisan will recognize that, though mold-and-press process are discussed in the context of the manufacture of the variable thickness rotors, in various aspects a similar process may be used to form and shape other components of the electric motor assembly, for example the electric motor assembly 100 illustrated in FIG. 1.

Figure 2:
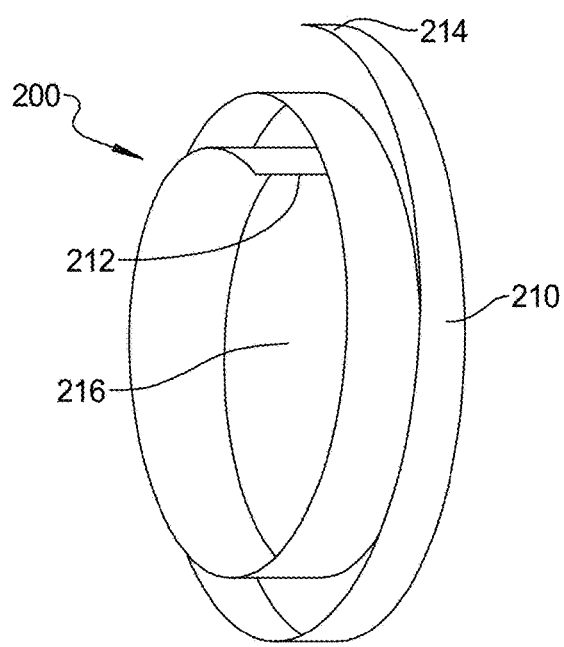
FIG. 2 is a perspective view of an example laminated annular-shaped rotor in accordance with various aspects of the present disclosure.

In other aspects, as illustrated in FIG. 2, variable thickness rotors 200, may be laminated disks comprising a metallic strip 210, for example a laminated silicon steel strip. To form the variable thickness rotor 200, the metallic strip 210 may be rolled or coiled and, in certain aspects, pressed. In various aspects, the metallic strip 210 may be coated, for example, with a non-electrically conductive material (such as a siloxane-based material, a silicone varnish, or a metal-organic or inorganic insulating material, more specifically one or more of a silicate layer, an oxide layer, a and phosphate layer) so as to increase electrical resistance between the laminated layers. Incorporation of such a coating may reduce eddy currents, as well as providing corrosion resistance.

The metallic strip 210 may be shaped so as to define the variable thickness rotor. For example, a first end 212 of the metallic strip 210 may have a first thickness. A second end 214 of the metallic strip 210 may have a second thickness. The first thickness of the first end 212 may be greater than the second thickness of the second end 214. For example, the first thickness may be greater than or equal to about 200%, and in certain aspects, greater than or equal to about 300%, larger than the second thickness. The metallic strip 210 may be rolled or coiled such that the first end 212 defines a first position 216, for example in certain aspects, a center 216 of the rotor 200, so that the variable thickness rotor has a greater thickness at its center 216. In various aspects, the first thickness of the first end 212 may be greater than or equal to about 10 mm to less than or equal to about 100 mm, and in certain aspects, greater than or equal to about 20 mm to less than or equal to about 50 mm. The second thickness of the second end 214 may be greater than or equal to about 5 mm to less than or equal to about 50 mm, and in certain aspects, greater than or equal to about 10 mm to less than or equal to about 30 mm.

In various aspects, the present disclosure provides methods of forming the rotors having interiorly disposed magnets, such as may be used in the electric motor assembly 100 illustrated in FIG. 1. As noted above, in various aspects, magnets may be disposed within recesses or cavities defined within the first or second rotors. In such instances, the radial resistance, for example magnetic reluctance, in the d-axis may be different from the reluctance in the q-axis so as to allow reluctance torque to be generated, improving motor torque capabilities by at least 50% compared to conventional rotors. In certain aspects, the recesses or cavities defined within the first or second rotors may have a V-shape.

Figure 3A:
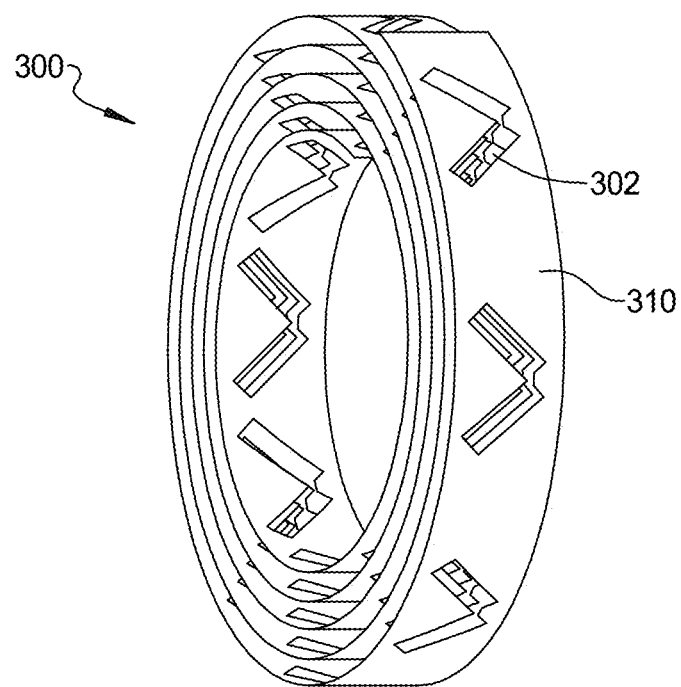
FIG. 3A is a perspective view of another example laminated annular-shaped in accordance with various aspects of the present disclosure.

As illustrated in FIG. 3A, in various aspects, like the variable thickness rotor 200 illustrated in FIG. 2, rotors 300 having recesses or cavities 302, for example where permanent magnets may be disposed, may also be laminated disks comprising a metallic strip 310, for example a laminated silicon steel strip having, in certain instances, a non-electrically conductive material coating disposed on one or more surfaces thereof. In such instances, the metallic strip 310 may be stamped or punched prior to rolling or coiling. For example, the metallic strip 310 may be stamped or punched to form predetermined and substantially uniform shapes at predetermined positions along the strip 310 such that when the metallic strip 310 is coiled to form the rotor 300, the rotor 300 includes a plurality of recesses or cavities 302 that, in certain aspects, extend from a first or exterior surface of the rotor 300 to a second or interior surface of the rotor 300. In certain instances, the metallic strip 310 may be stamped or punched prior to rolling or coiling of the metallic strip 310. In other instances, the metallic strip 310 may be stamped or punched as the metallic strip 310 is rolled or coiled. Though not shown, in various aspects, permanent magnets may be disposed within the plurality of cavities 302.

Figure 3B:
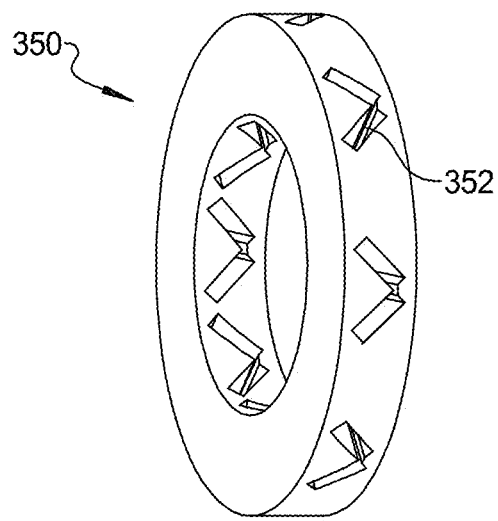
FIG. 3B is a perspective view of an example of a pressed annular-shaped rotor in accordance with various aspects of the present disclosure.

As illustrated in FIG. 3B, in certain variations, rotors 350 having recesses or cavities 352, for example permanent magnets may be disposed, may comprise one or more powder metal magnetic materials, for example a non-conductive, soft magnetic composite ("SMC") material. In such instances, a rotor 350 may be formed using, for example, a mold-and-press process, which may include placing a powder comprising the soft magnetic composite material in a pre-defined mold and adding varying amounts of pressure and, in certain instances, heat. In various aspects, the pre-defined mold may be configured so as to define a plurality of recesses or cavities 352 within the rotor 350. For example, in certain instances, the pre-defined mold may be shaped such that the cavities are disposed substantially along a circumferential direction. In other instances, the pre-defined mold may be shaped such that the cavities are radially disposed. Though not shown, in various aspects, permanent magnets may be disposed within the plurality of cavities 352.

Though not shown, the skilled artisan will appreciate that in various aspects an annular-shaped rotor for an electric motor may have a variable radial thickness as wells as one or more interiorly disposed permanent magnets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rotor for an electric motor, the rotor comprising:
an annular-shaped rotor body having a first thickness at a first radial position and a second thickness at a second radial position, wherein the first radial position is spaced apart from the second radial position and the first thickness is greater than or equal to about 200% of the second thickness; and
a plurality of permanent magnets that define a plurality of magnetic poles.

2. The rotor of claim 1, wherein the annular-shaped rotor body defines a centrally disposed aperture adjacent to the first radial position and the second radial position corresponds to a periphery of the annular-shaped rotor body.

3. The rotor of claim 2, wherein the annular-shaped rotor body comprises a soft magnetic composite powder.

4. The rotor of claim 2, wherein the annular-shaped rotor body further defines a plurality of cavities.

5. The rotor of claim 4, wherein a plurality of permanent magnets is disposed in one or more of the plurality of cavities.

6. The rotor of claim 2, wherein the annular-shaped rotor body comprises a metallic strip that is coiled to form an annular shape, wherein a first end of the metallic strip has a first strip thickness and a second end of the metallic strip has a second strip thickness, wherein the first strip thickness is substantially equal to the first thickness and the second strip thickness is substantially equal to the second thickness.

7. The rotor of claim 6, wherein the metallic strip comprises a laminated silicon steel strip.

8. The rotor of claim 6, wherein the metallic strip is coated on one or more surfaces with a non-electrically conductive material coating.

9. The rotor of claim 6, wherein a plurality of apertures are stamped into the metallic strip, wherein the apertures are configured to form a plurality of interior cavities when the metallic strip is coiled to form the annular-shaped rotor body.

10. The rotor of claim 9, wherein the plurality of permanent magnets are disposed in one or more of the plurality of interior cavities.

11. The rotor of claim 1, wherein the annular-shaped rotor body further defines a first axial surface, wherein the plurality of permanent magnets is disposed on the first axial surface in a predetermined arrangement.

12. An axial flux motor comprising:
a first annular-shaped rotor defining a first major surface;
a second annular-shaped rotor defining a second major surface, wherein the second major surface of the second annular-shaped rotor is parallel with the first major surface of the first annular-shaped rotor and each of the first annular-shaped rotor and the second annular-shaped rotor has an annular-shaped rotor body comprising:
a centrally disposed aperture;
a periphery;
a first thickness at a first radial position adjacent to the centrally disposed aperture;
a second thickness at a second radial position corresponding to the periphery, wherein the first thickness is greater than or equal to about 200% of the second thickness; and
a plurality of permanent magnets that define a plurality of magnetic poles;
a stator disposed between the first and second annular-shaped rotors, wherein a first gap exists between the stator and the first annular-shaped rotor and a second gap exists between the stator and the second annular-shaped rotor; and
a shaft that defines a rotational axis, wherein the shaft passes through each centrally disposed aperture of the first and second annular-shaped rotors and is fixedly attached thereto and the shaft traverses the stator, the shaft and the first and second annular-shaped rotors rotate together and the stator remains stationary with respect to shaft.

13. The axial flux motor of claim 12, wherein each of the annular-shaped rotor bodies comprises a soft magnetic composite powder, and wherein a mold-and-press process is used to form the annular-shaped rotor body and a mold defines the centrally disposed aperture and the perimeter of the annular-shaped rotor.

14. The annular-shaped rotor of claim 13, wherein the annular-shaped rotor body comprises a plurality of cavities and the plurality of permanent magnets are disposed in one or more of the plurality of cavities.

15. The axial flux motor of claim 12, wherein each of the first and second annular-shaped rotors comprises a metallic strip that is coiled to form the annular-shaped rotor body, wherein a first end of the metallic strip has a first strip thickness and a second end of the metallic strip has a second strip thickness, wherein the first strip thickness is substantially equal to the first thickness and the second strip thickness is substantially equal to the second thickness.

16. The axial flux motor of claim 15, wherein a plurality of apertures are stamped into the metallic strip and the apertures are configured to form a plurality of interior cavities when the metallic strip is coiled to form an annular shape, and wherein the plurality of permanent magnets are disposed in one or more of the plurality of interior cavities.

17. The axial flux motor of claim 15, wherein the metallic strip comprises a silicon steel strip, and wherein the silicon steel strip is coated on one or more surfaces with a non-electrically conductive material coating.

18. The axial flux motor of claim 15, wherein a plurality of permanent magnets is disposed on a first axial surface in a predetermined arrangement.

19. A rotor for an axial flux electric motor, the rotor comprising:
an annular-shaped rotor body comprising a metallic strip defining a first end and a second end and comprising a plurality of apertures, wherein the first end of the metallic strip has a first thickness and the second end of the metallic strip has a second thickness, and the metallic strip is coiled to form the annular-shaped rotor body, wherein the first thickness is greater than or equal to about 200% of the second thickness; and
a plurality of permanent magnets disposed in the plurality of apertures.

* * * * *